United States Patent
Ollier et al.

(10) Patent No.: US 11,906,422 B2
(45) Date of Patent: Feb. 20, 2024

(54) COMPACT PHOTOACOUSTIC DETECTION DEVICE

(71) Applicant: Commissariat à l'Energie Atomique et aux Energies Alternatives, Paris (FR)

(72) Inventors: Emmanuel Ollier, Grenoble (FR); Caroline Coutier, Grenoble (FR); Laurent Duraffourg, Grenoble (FR); Thierry Verdot, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 18/058,803

(22) Filed: Nov. 25, 2022

(65) Prior Publication Data
US 2023/0168183 A1 Jun. 1, 2023

(30) Foreign Application Priority Data
Nov. 28, 2021 (FR) ...................................... 21 12618

(51) Int. Cl.
*G01N 21/17* (2006.01)
*G01N 21/39* (2006.01)

(52) U.S. Cl.
CPC . *G01N 21/1702* (2013.01); *G01N 2021/1704* (2013.01); *G01N 2021/399* (2013.01)

(58) Field of Classification Search
CPC ........... G01N 21/1702; G01N 21/1704; G01N 21/1714; G01N 21/1742; G01N 2021/1704; G01N 2021/399
See application file for complete search history.

(56) References Cited

U.S. PATENT DOCUMENTS

| | | |
|---|---|---|
| 2012/0266655 A1 | 10/2012 | Brun et al. |
| 2013/0315547 A1 | 11/2013 | Brun et al. |
| 2015/0101395 A1* | 4/2015 | Dehe ................... G01N 21/1702 73/24.02 |
| 2016/0282259 A1* | 9/2016 | Kolb ....................... G01N 29/30 |
| 2018/0136166 A1* | 5/2018 | Voinea ............... G01N 21/1702 |
| 2022/0205901 A1* | 6/2022 | Coutard ............... G01N 33/487 |

FOREIGN PATENT DOCUMENTS

FR 2 974 413 A1 10/2012

OTHER PUBLICATIONS

French Preliminary Search Report dated Jul. 18, 2022 in French Application 21 12618, filed on Nov. 28, 2021 (with English Translation of Categories of cited documents and Written Opinion), citing documents 1-2, 15 and 24 therein, 11 pages.

Firebaugh, S. et al. "Miniaturization and integration of photoacoustic detection" Journal of Applied Physics vol. 92, No. 3, American Institute of Physics (2002) 9 pages.

* cited by examiner

*Primary Examiner* — Suman K Nath
(74) *Attorney, Agent, or Firm* — Oblon, McClelland, Maier & Neustadt, L.L.P.

(57) ABSTRACT

The invention relates to a device for detecting a gaseous species by photoacoustic effect. The device comprises a substrate, inside which a cavity is formed. A light source is disposed on the substrate, in such a way that a part of the substrate extends between the light source and the cavity. The device is arranged in such a way that the light, emitted by the light source, is propagated through the substrate, before reaching the cavity.

14 Claims, 7 Drawing Sheets

COMPACT PHOTOACOUSTIC DETECTION DEVICE

TECHNICAL FIELD

The technical field of the invention is a detection device based on photoacoustic effect.

PRIOR ART

Photoacoustic detection allows detection of a low concentration of a gaseous species, present in a gas or gas mixture, in traces. The operating principle relies on a periodic illumination of the gas at a wavelength corresponding to a spectral band of absorption of the gaseous species sought. The illumination can be pulsed or, more generally, amplitude-modulated, according to a determined period. The illumination causes a periodic heating of the gas, the latter generating a pressure wave. The pressure wave is detected by an acoustic sensor. Thus, the detection of the acoustic wave makes it possible to quantify a concentration of the gaseous species in the gas being analyzed. The photoacoustic detection allows the design of gas sensors for uses in the industrial or medical domain.

Generally, the illumination is performed in a wavelength in the near or mid-infrared range, typically between 0.8 µm and 12 µm. These wavelengths correspond to vibrational absorptions (pure or compound) of specific chemical bonds contained in the molecule or molecules of gas (for example: C—H, C—O, N—H, S—O, C—C, C—F etc.). The visible or ultraviolet wavelengths are also used for gases which have no effective spectral response in the infrared range (ozone will for example be used, for which the strongest absorption is located in the UV-C band, around 0.25 µm).

The illumination is amplitude-modulated according to a modulation frequency that generally lies between 100 Hz and 50 kHz. The illumination can be subjected to a wavelength sweep, which makes it possible to successively address different gaseous species.

The miniaturization of the acoustic sensors makes it possible to obtain photoacoustic detection devices that are compact and sensitive. One objective of the invention described hereinbelow is to obtain a detection device, based on photoacoustic effect, whose bulk is reduced and that allows an optimal integration of the components forming the device, in particular the light source producing the illumination.

SUMMARY OF THE INVENTION

A first subject of the invention is a photoacoustic detection device, comprising:
- a light source, configured to emit a light beam about an illumination axis;
- a cavity, intended to receive a gas;
- a detector, configured to detect an acoustic wave being propagated through the cavity;

the device comprising a substrate, extending between a bottom face and a top face, wherein the substrate is such that:
- the cavity is formed in the substrate, between the bottom face and the top face;
- a trench is formed in the substrate, delimited by the top face, the light source being inserted into the trench, on the top face, the top face thus extending between the cavity and the light source;
- the substrate comprises an illumination portion, delimiting the trench, disposed facing the light source, the illumination portion extending between:
  - a proximal face, formed on the top face, disposed opposite the light source;
  - and a distal face, formed on the top face, the distal face forming a reflector configured to reflect the light towards the cavity;

such that the light beam, emitted by the light source, is propagated, through the illumination portion, between the proximal face and the distal face, before being reflected, by the distal face, towards the cavity.

According to one possibility, the distal face comprises a reflecting layer, forming the reflector.

According to one possibility, an antireflection layer is deposited on the proximal face.

According to one embodiment,
- the proximal face extends at right angles to a proximal normal axis;
- the illumination axis is inclined with respect to the proximal normal axis.

The illumination axis can be inclined with respect to the proximal normal axis, by an angle of inclination of between 50° and 60° or between 3° and 10°.

According to one embodiment,
- the distal face extends at right angles to a distal normal axis;
- the distal normal axis is secant to the proximal normal axis.

According to one embodiment,
- the trench extends to a bottom;
- the illumination axis is parallel, or substantially parallel, to the bottom of the trench.

According to one embodiment, the distal face extends parallel, or substantially parallel, to the illumination axis.

According to one embodiment:
- the substrate comprises an auxiliary trench, delimited by the top face;
- the distal face delimits the auxiliary trench;
- the illumination portion extends between the trench and the auxiliary trench.

The trench and the auxiliary trench are then offset with respect to one another along the illumination axis.

According to one possibility:
- the cavity is delimited by an inner face;
- the inner face comprises an admission portion, intended for an admission of the light beam being propagated towards the cavity from the distal face;
- the inner face comprises a reflecting layer, outside of the admission portion.

The admission portion can correspond to an intersection between the light beam and the inner face.

The detector is preferably disposed in fluidic contact with the cavity, between the bottom face and the top face.

The cavity can be linked to at least one fluidic channel, extending through the substrate, to allow the cavity to be filled by the gas, and/or the gas to be discharged.

Preferably, the light source emits in an emission spectral band, in the infrared range, the substrate being formed by a material exhibiting a transmittance in the emission spectral band, such that at least 10% of the light power of the light beam, emitted by the source, reaches the cavity after being propagated from the proximal face to the distal face then from the distal face to the cavity.

Another subject of the invention is a method for analyzing a gas using a device according to the first subject of the invention, the method comprising:

a) admission of the gas into the cavity;
b) activation of the light source, such that the light source emits a periodically amplitude-modulated light beam;
c) detection, by the detector, of a periodic variation of a pressure, generated in the cavity by photoacoustic effect;

wherein the light beam, emitted by the light source, is propagated, through the substrate:
from the proximal face to the distal face of the illumination portion;
then from the distal face to the cavity.

The invention will be better understood on reading the explanation of the exemplary embodiments, presented, hereinafter in the description, in association with the figures listed below.

FIGURES

FIG. 1D is a cross-sectional view on the transverse plane $P_{ZX}$.

FIGS. 5A to 5C illustrate a second exemplary embodiment.

FIG. 6 illustrates a third embodiment. FIG. 6 is a cross-sectional view in the transverse plane $P_{ZX}$.

EXPLANATION OF PARTICULAR EMBODIMENTS

FIGS. 1A to 1F schematically represent a first exemplary embodiment of an analysis device based on photoacoustic detection according to the invention. The device comprises a substrate 2 extending, along a transverse axis Z, between a bottom face 20 and a top face 30. The substrate 2 comprises a cavity 40, intended to receive a sample to be analyzed, and notably a gas sample. The cavity 40 extends between the bottom face 20 and the top face 30, along a transverse axis Z.

Figure 1A:
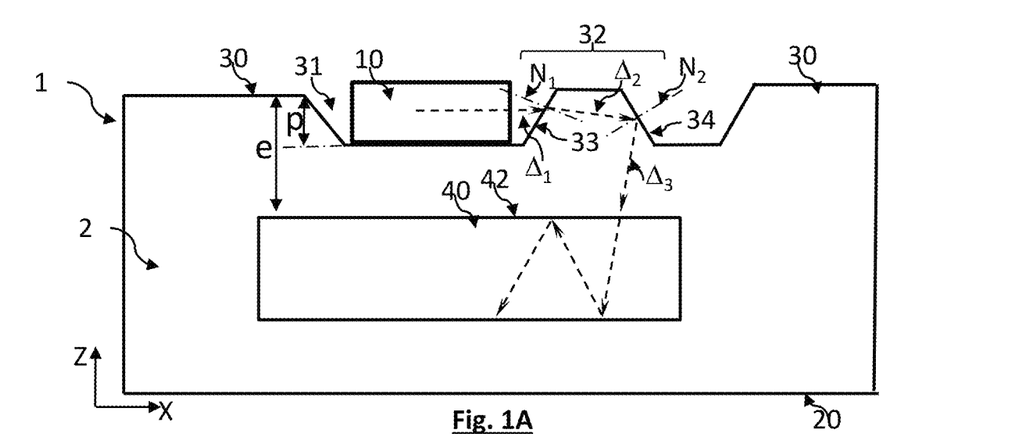
FIG. 1A is a cross-sectional view of a first example of a device, in a transverse plane $P_{ZX}$, parallel to a transverse axis Z and to a longitudinal axis X.
Figure 1B:
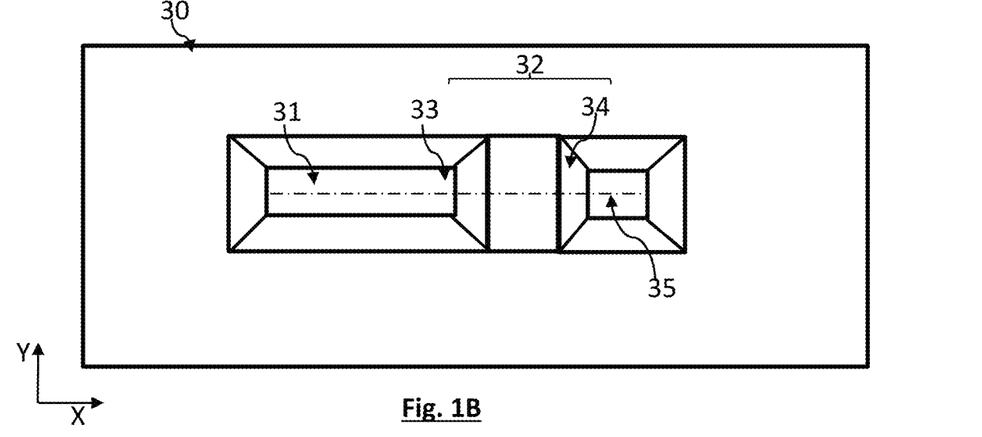
FIG. 1B is a top view of the device schematically represented in FIG. 1A, parallel to a plane $P_{YX}$, at right angles to the transverse axis Z.
Figure 1C:
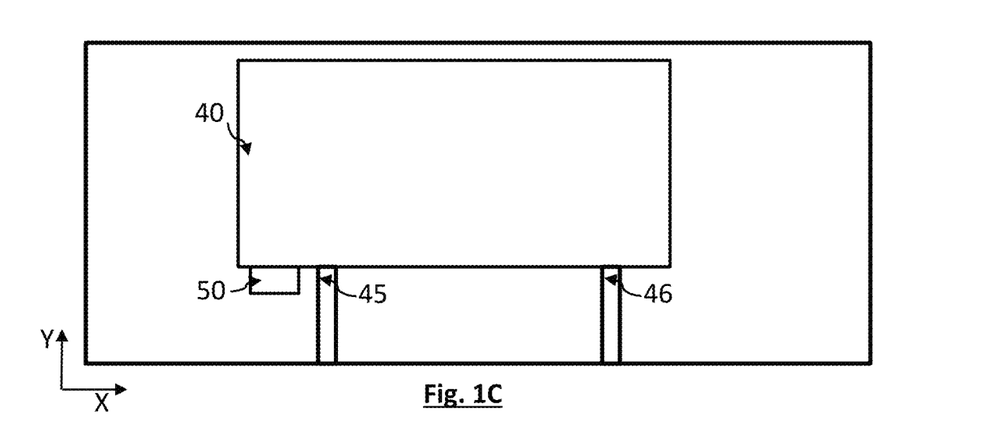
FIG. 1C is a cross-sectional view of the device schematically represented in FIG. 1A, in a cutting plane parallel to the plane $P_{YX}$ and passing through the cavity.

FIG. 1A is a cross-sectional view of the device, in a transverse plane $P_{ZX}$, parallel to the transverse axis Z and to a longitudinal axis X. FIG. 1B is a top view of the device, parallel to a plane $P_{YX}$, at right angles to the transverse axis Z, and parallel to the longitudinal axis X and to a lateral axis Y. FIG. 1C is a cross-sectional view of the device, in a cutting plane parallel to the plane $P_{YX}$ and passing through the cavity 40.

The cavity 40 is linked to orifices 45, 46, formed in the substrate 2, allowing the admission and the discharging of the gas to be analyzed.

The device 1 comprises a light source 10, disposed on the top face 30. The light source 10 is configured to emit a light beam 11, the wavelength of which corresponds to an absorption wavelength of a gaseous species to be analyzed. The absorption wavelength is situated conventionally in the near or mid-infrared range, typically between 0.8 µm and 12 µm. The light source 10 can be a high-frequency, typically 100 kHz to 1 MHz, pulsed QCL laser. The pulses can be amplitude-modulated according to a low-frequency envelope, as a function of the desired acoustic frequency. It can be a resonance frequency of the cavity 40 or of an acoustic detector 50 described hereinbelow. The light source can be an amplitude-modulated laser diode.

The light source 10 emits the light beam 11 extending about an illumination axis $\Delta_1$. Preferably, the illumination axis $\Delta_1$ extends parallel, or substantially parallel, to the plane $P_{XY}$. Substantially parallel is understood to mean parallel taking into account an angular tolerance of ±20° or ±10°. The light source 10 is preferably a laser source. The light source emits the light beam 11 in an emission spectral band lying between 0.8 µm and 12 µm. The light source can notably be a laser light source.

The substrate 2 is produced in a material exhibiting a high light transmission in the emission spectral band of the light source. It can be monocrystalline silicon (Si), germanium (Ge), an alloy SiGe or chalcogenides of TeGe, TeGeSe type or any other material transparent to the radiation emitted by the light source 10.

The cavity 40 comprises or is linked to an acoustic detector 50, the latter being configured to measure a pressure variation being established in the cavity 40, by photoacoustic effect. The pressure variation results from a heating of molecules of a gaseous species under the effect of an illumination by the light beam emitted by the laser light source, at the absorption wavelength of the gaseous species concerned. The acoustic detector 50 can be of microphone type, or an electromechanical microresonator. Thus, the acoustic detector 50 is contained in the substrate 2, inside the cavity 40 or in fluidic communication with the cavity. That favours the compactness of the device.

In the example represented, the substrate 2 is obtained by the assembly of a base and a cap. The base extends between the bottom face 20 and the cavity 40. The cap extends between the cavity 40 and the top face 30. The cavity 40 is closed following assembly of the cap on the base. Prior to assembly, all or part of the cavity is formed on the base and/or on the cap.

An important aspect of the invention is that the light source 10 is placed on the top face 30 of the substrate. Thus, the light source is outside of the substrate, above the cavity. That makes it possible to minimize the surface area occupied by the device in a plane $P_{XY}$ at right angles to the transverse axis Z. To this end, a trench 31 is formed on the top face 30. The light source 10 is disposed in the trench. Thus, the substrate 2, which contains the cavity, serves as support for the light source 10.

The trench 31 extends, parallel to the axis Z, to a trench bottom. The light source 10 rests facing or on the bottom of the trench. Preferably, the illumination axis $\Delta_1$ is parallel or substantially parallel to the bottom of the trench 31. The trench bottom extends preferably at right angles (or substantially at right angles) to the transverse axis Z. Thus, the illumination axis $\Delta_1$ is at right angles, or substantially at right angles, to the transverse axis Z.

The light source 10 can be disposed on the trench according to an assembly method of "Die to Wafer" type performed for example by "pick-and-place" type equipment, the substrate being formed by a wafer which comprises a large number of adjacent substrates. The wafer consists of a plurality of identical substrates, adjacent to one another, each substrate being intended to form a device 1. The substrates are separated from one another after the assembly of a light source on each substrate, so as to simultaneously obtain a plurality of devices.

The depth p of the trench, along the transverse axis Z, is such that when the light source 10 is placed in the trench 31, the illumination axis $\Delta_1$ crosses an illumination portion 32 of the substrate, extending between the top face 30 and the cavity 40.

A notable aspect of the invention is that the light beam 11 emitted by the light source 10 is folded back towards the cavity 40 by being propagated through the substrate 2, by combining refraction and/or reflection effects. Thus, the use of light guides, interposed between the light source 10 and the cavity 40 is avoided, the latter generally requiring an active alignment of the laser source with respect to the input of the guide: the laser source emits light and the latter is positioned by optimizing the light transmitted through the guide, on a case-by-case basis. That is not compatible with the objective of low-cost mass production.

The illumination portion 32 corresponds to a part of the substrate 2, delimiting the trench 31, illuminated by the light beam 11. The illumination portion 32 extends, along the illumination axis, between a proximal face 33 and a distal face 34. The proximal face 33 and the distal face 34 are parts of the top face 30. The light beam penetrates into the illumination portion 32 through the proximal face 33, to reach the distal face 34. In the example represented in FIGS. 1A to 1F, the illumination portion 32 results from the formation of an auxiliary trench 35 on the top face 30 of the substrate. Thus, according to this configuration, the illumination portion 32 extends between the trench 31 and the auxiliary trench 35. The proximal face 33 delimits the trench 31. The distal face 34 delimits the auxiliary trench 35. The trench 31 and the auxiliary trench 35 are offset, from one another, parallel to the illumination axis $\Delta_1$, or, more generally, parallel to an axis at right angles to the transverse axis Z.

Figure 1D:
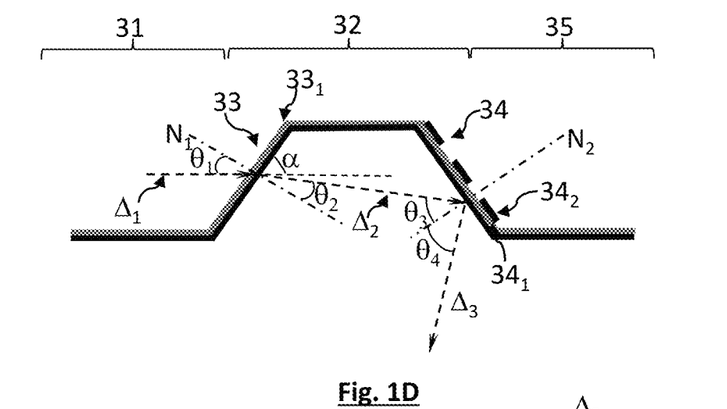
FIG. 1D is a detail view of a portion of the substrate, called illumination portion, through which the light emitted by the source is propagated.
Figure 2A:
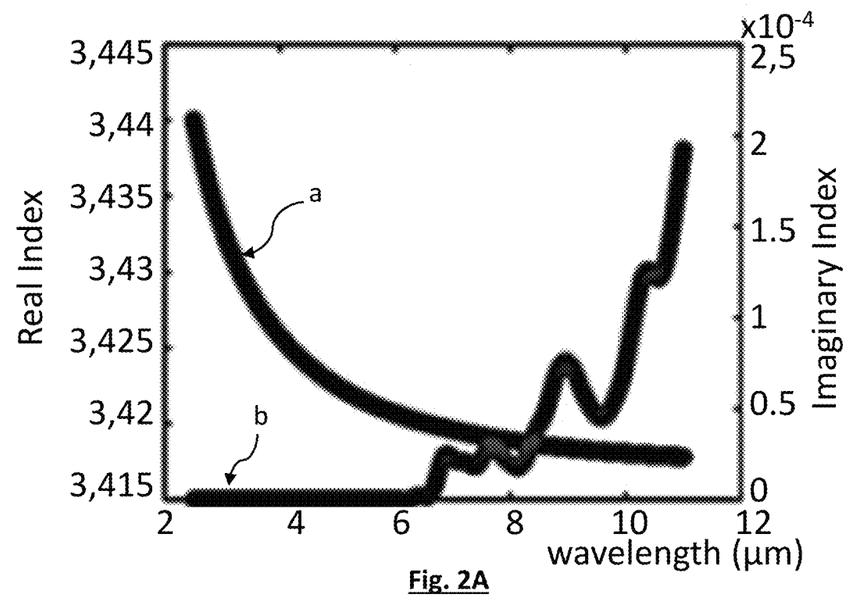
FIGS. 2A and 2B represent the real (curves a) and imaginary (curves b) optical indices of monocrystalline silicon and of silicon nitride respectively.
Figure 2B:
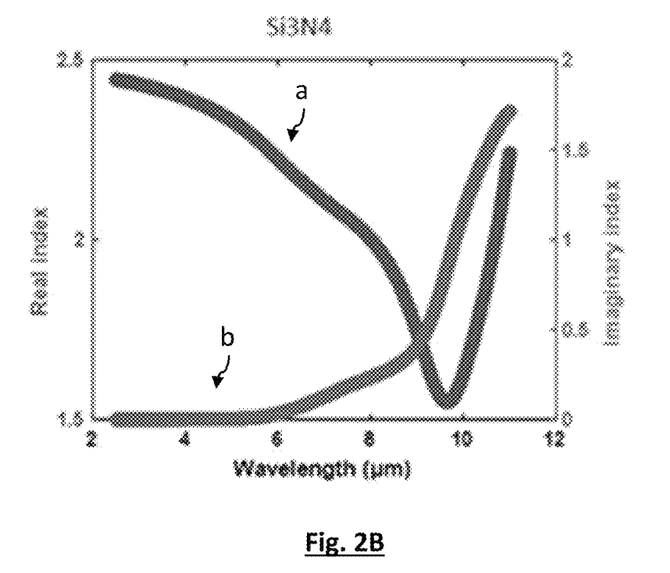

FIG. 1D schematically represents the illumination portion 32. The proximal face 33 corresponds to the part of the top face 30 intersecting the light beam. The proximal face 33 can advantageously comprise a layer of an antireflection material $33_1$. When the substrate 2 is made of silicon, the antireflection layer $33_1$ can be formed by $Si_3N_4$ (silicon nitride). The refractive index of silicon nitride allows index matching between the index of the air, outside the substrate 2, and the index of the silicon. FIGS. 2A and 2B represent the real (curves a—y axis on the left) and imaginary (curves b—y axis on the right) optical indices of monocrystalline silicon and of silicon nitride respectively. $Si_3N_4$ exhibits a refractive index of which the real part is lower than that of Si, and of which the imaginary part is of the same order of magnitude as Si, and within the 2 μm-11 μm spectral band. In FIGS. 2A and 2B, the x axis corresponds to the wavelength (μm).

The antireflection layer $33_1$ can be formed by a stacking of the following materials: $Si_3N_4$, ZnS or stackings based on ZnS (ZnS—Ge, ZnS—$Ta_2O_3$ etc.). The antireflection layer $33_1$ makes it possible to increase the quantity of light transmitted through the proximal face 33.

The proximal face 33 is inclined with respect to the illumination axis $\Delta_1$. The proximal face 33 can be inclined in such a way that the illumination axis $\Delta_1$ is slightly inclined with respect to the normal $N_1$ to the proximal face 33, called proximal normal. The angle of incidence $\theta_1$ formed between the illumination axis $\Delta_1$ and the proximal normal $N_1$ can then lie between 3° and 10°.

Figure 3A:
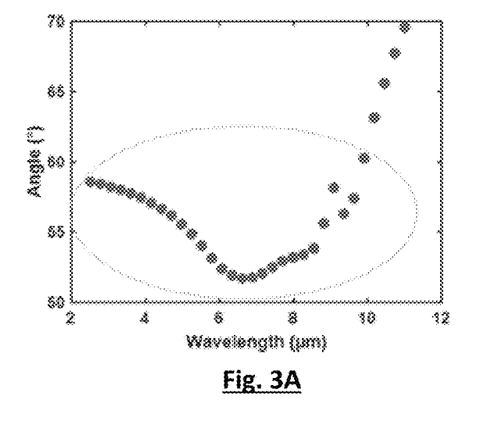
FIG. 3A represents the angle, called Brewster's angle, as a function of the wavelength, of an antireflection layer of silicon nitride deposited on a silicon plate. This angle is defined by the incident ray on the layer of silicon nitride and the normal to that layer, for which the reflection of the light is minimal.

Advantageously, the angle of incidence $\theta_1$ can correspond to Brewster's angle, which makes it possible to minimize the reflection of the polarized incident light wave in TM (Transverse Magnetic) mode. Such an embodiment is suitable notably when the light source is a QCL (Quantum Cascade Laser) laser source, because this type of laser source emits only according to this polarization. FIG. 3A represents Brewster's angle (y axis—unit degree) as a function of the wavelength (x axis—μm) by taking into account an antireflection layer of $Si_3N_4$ deposited on a substrate of Si. It is observed that, between 2 and 10 μm, Brewster's angle varies around 55°, and lies between 50° and 60°. It is also observed that Brewster's angle varies little between the wavelengths of 2 μm and 10 μm.

Figure 3B:
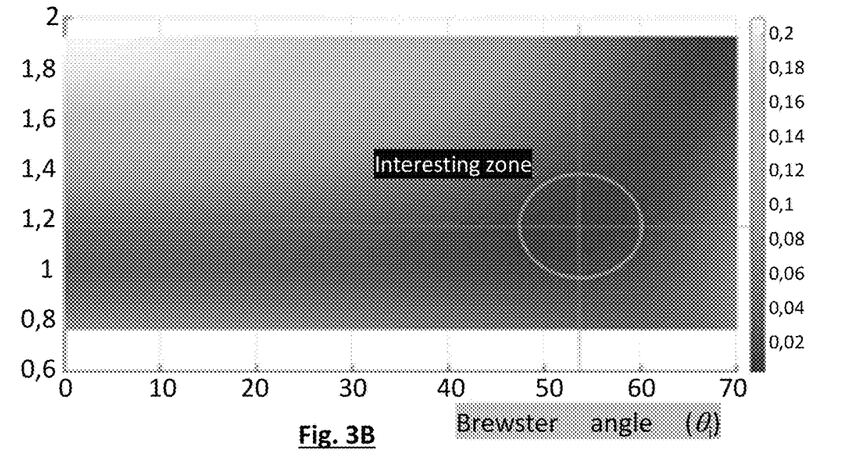
FIG. 3B represents an intensity of the light reflected by a layer of silicon nitride, as a function of the angle of incidence (x axis, units °) and of the thickness of the layer (y axis—µm), for a wavelength of 7.7 µm.

FIG. 3B shows the intensity of the light reflected by a layer of $Si_3N_4$ (grey level) as a function of the thickness of the layer of $Si_3N_4$ (y axis—μm) and of the angle of incidence $\theta_1$ (x axis—degrees). It can be seen that the minimum intensity is obtained for angles $\theta_1$ lying between 50° and 60°, which corresponds to the angular range including Brewster's angle. Thus, the proximal face 33 is preferably flat, and forms an angle α lying between 30° and 40° with respect to the illumination axis $\Delta_1$. Such an angular range is suitable for an extended wavelength range, between 2 μm and 10 μm. The angle α is represented in FIG. 1D. It corresponds to $\pi/2-\theta_1$.

The trench 31 is formed in the substrate, to a bottom. The bottom extends at right angles or substantially at right angles to the transverse axis Z. The illumination axis $\Delta_1$ is generally oriented parallel to the bottom of the trench 31. The angle α corresponds to the inclination of the proximal face 33 with respect to the bottom of the trench 31. It is possible to obtain such an inclination by etching the trench by $Cl_2/HBr/O_2$ plasma etching or by chemical etching of KOH (potassium hydroxide) type. The KOH chemical etching makes it possible to produce an angle of inclination α=54.74° when the material forming the substrate is silicon of crystalline orientation [100].

Figure 3C:
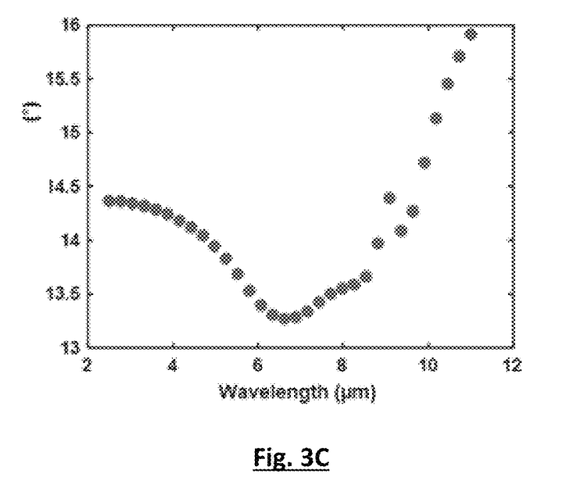
FIG. 3C represents, the refracted angle in a silicon plate, as a function of the wavelength (x axis—µm), when the angle of incidence at the input dioptre corresponds to Brewster's angle.

The light beam 11 emitted by the light source 10 is refracted by the proximal face 33 and is propagated, in the form of a refracted beam 12, in the illumination portion 32 about a refraction axis $\Delta_2$. The refraction axis $\Delta_2$ forms a refraction angle $\theta_2$ with the proximal normal $N_1$. FIG. 3C shows the refraction angle $\theta_2$ (y axis, degrees), as a function of the wavelength (x axis—μm) when the angle of incidence $\theta_1$ is Brewster's angle. The angles of incidence $\theta_1$ and of refraction $\theta_2$ are represented in FIG. 1D.

The distal face 34 can comprise a reflecting layer $34_2$. It can for example be a metallic layer, deposited on the top face 30. The reflecting layer $34_2$ can be made of gold. The distal face can also comprise an antireflection layer $34_1$.

The refracted beam 12 is propagated through the illumination portion 32, about the refraction angle $\Delta_2$. It is then reflected by the distal face 34, to form a reflected beam 13, which is propagated to the cavity 40 on a reflection axis 43. In FIG. 1D, the angle $\theta_3$ between the refraction axis $\Delta_2$ and the distal normal $N_2$ (i.e. the normal to the distal face 34) has been represented, as has the angle $\theta_4$ between the reflection axis $\Delta_3$ and the distal normal $N_2$. The distal face 34 is arranged in such a way that the reflection axis 43 intersects the cavity 40.

Thus, the light beam emitted by the source 10 is propagated in succession through the illumination portion 32 between the proximal face 33 and the distal face 34. The light beam is then reflected by the distal face 34 and is propagated through the substrate to the cavity 40.

Figure 1E:
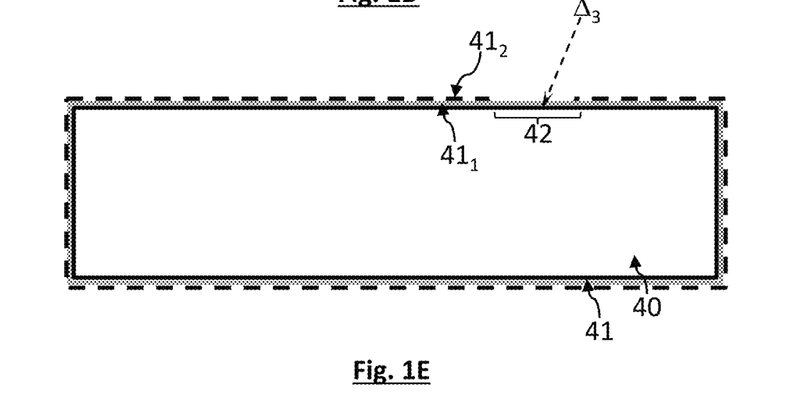
FIG. 1E is a cross-sectional view of the cavity, on the transverse plane $P_{ZX}$.

FIG. 1E schematically represents the cavity 40. The cavity is intended to be filled by the gas to be analyzed. The cavity is delimited by an inner wall 41 forming the interface between the cavity 40 and the substrate 2. The wall comprises an admission portion 42, through which all or part of the beam 13 reflected by the distal face 34 is propagated.

Preferably, the inner wall 41 of the cavity 40 is covered by an antireflection layer $41_1$, notably at the admission portion 42. The antireflection layer $41_1$ can be as described in association with the proximal face 33. The inner wall 41 of the cavity can also be advantageously covered by a reflecting layer $41_2$, except at the admission portion 42. The reflecting layer $41_2$ facilitates the containment and the propagation of the light inside the cavity 40, which allows for a more uniform lighting of the cavity 40. That enhances the detection sensitivity. The reflecting layer $41_2$ can be as described in association with the distal face 34. The reflecting layer also makes it possible to limit a propagation of the light beam, having penetrated into the cavity, out of the latter, through the substrate. That makes it possible to reduce any acoustic noise induced by the propagation of the light beam through the substrate The dimensions of the cavity can be adjusted according to the nature of the gas and the working frequency employed to modulate the amplitude of the light source. Thus, to reduce the heat losses by thermal conduction, the smallest characteristic dimension of the cavity exceeds, preferably, the thickness of a thermal boundary layer which is formed at the walls. As an example, when the gas comprises air, and for a source amplitude-modulation frequency of 1000 Hz, the thickness of the thermal boundary layer is of the order of 100 μm. It is then recommended that the characteristic dimensions be greater than 200 μm.

Figure 1F:
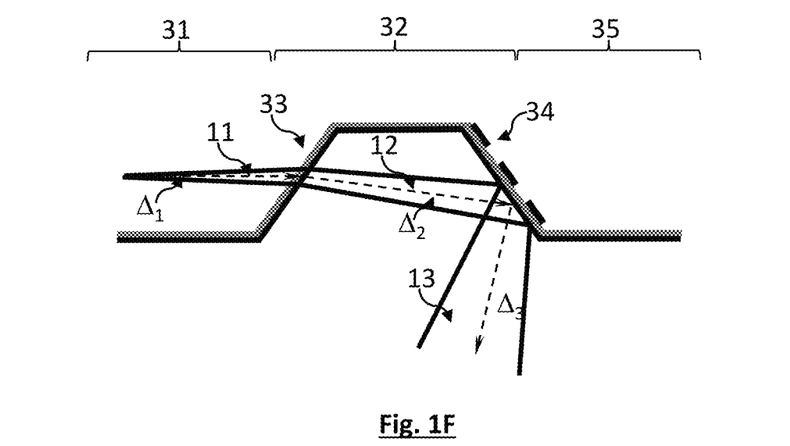
FIG. 1F is a cross-sectional view, on the transverse plane $P_{ZX}$, of the illumination portion.
Figure 4A:
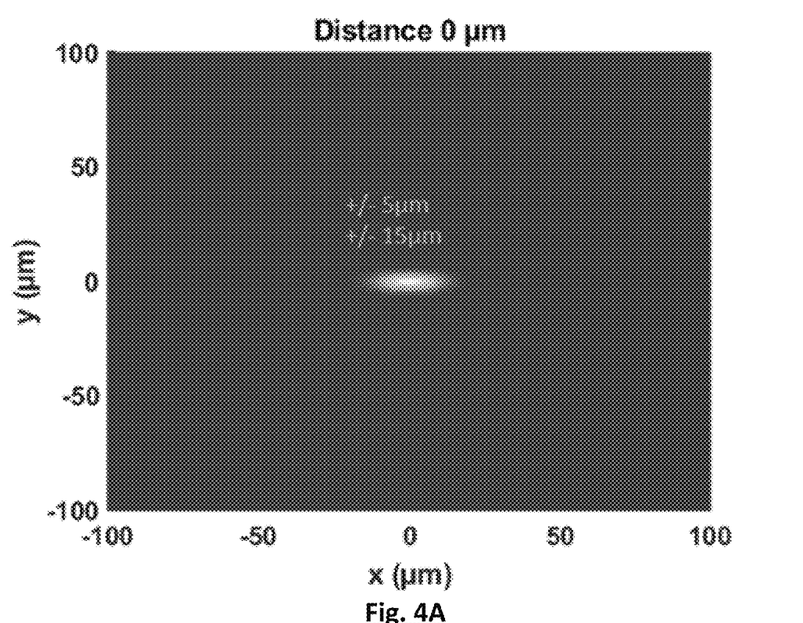
FIGS. 4A and 4B show the form of an emitted laser light beam on contact and at a distance of 600 µm from a laser source of QCL (Quantum Cascade Laser) type.
Figure 4B:
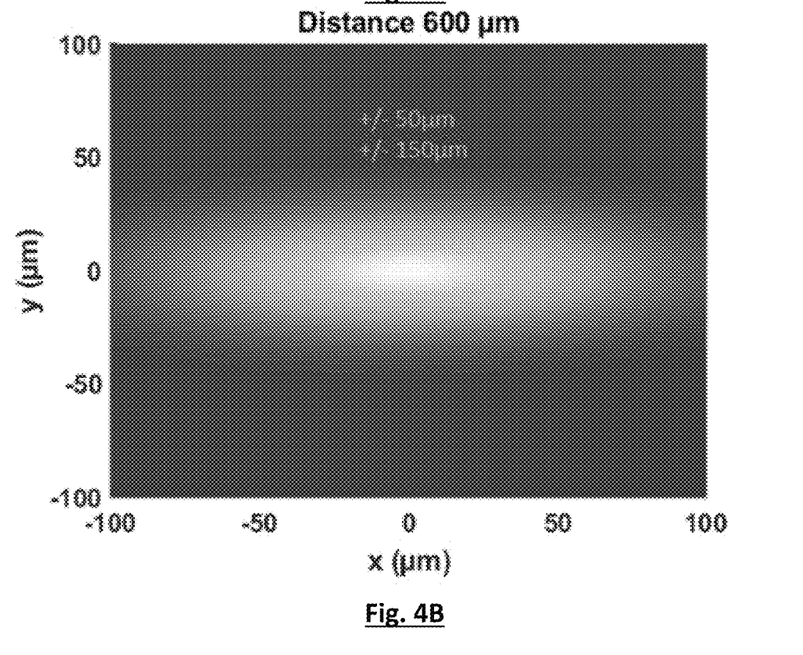

During the propagation through the substrate 2, the light beam emitted by the light source 10 undergoes a spatial divergence, as represented in FIG. 1F. FIGS. 4A and 4B show an image of a light beam emitted by a QCL laser source, respectively at the output of the light source and at a distance of 600 μm therefrom. Each image is formed in a plane at right angles to the light beam propagation axis. In such a plane, the light beam takes the form of an ellipsoid surface, defined by a large axis and a small axis. At the output of the light source, the large axis and the small axis measure approximately 15 μm and 5 μm respectively. The half-divergence angle of the light beam is generally approximately 10° on the small axis and approximately 30° on the large axis. At 600 μm, the large axis and the small axis measure approximately 150 μm and 50 μm respectively. The dimensions of the admission portion 42 are adjusted as a function of the divergence of the light beam, so as to maximize the quantity of light being propagated in the cavity 40.

In the configuration schematically represented in FIGS. 1A to 1F, it is estimated that the percentages of transmission of the light at the proximal face 33, at the distal face 34 and through the substrate 2 are, respectively, 95%, 65% and 75%. At the wavelength of 7 μm, the light power penetrating into the cavity is thus approximately 45% of the light power emitted by the light source. This percentage corresponds to a transmittance of the substrate between the proximal face 33 and the cavity 40. This calculation was performed by taking account of the following parameters:

angle of incidence $\theta_1$ Brewster's angle: $\theta_1=51°$,
antireflection layer: $Si_3N_4$ thickness 800 nm;
thickness e of the substrate between the top face and the cavity: 200 μm;
depth p of the trench: 100 μm
optical length travelled by the light beam in the substrate: 0.83 mm.

Figure 5A:
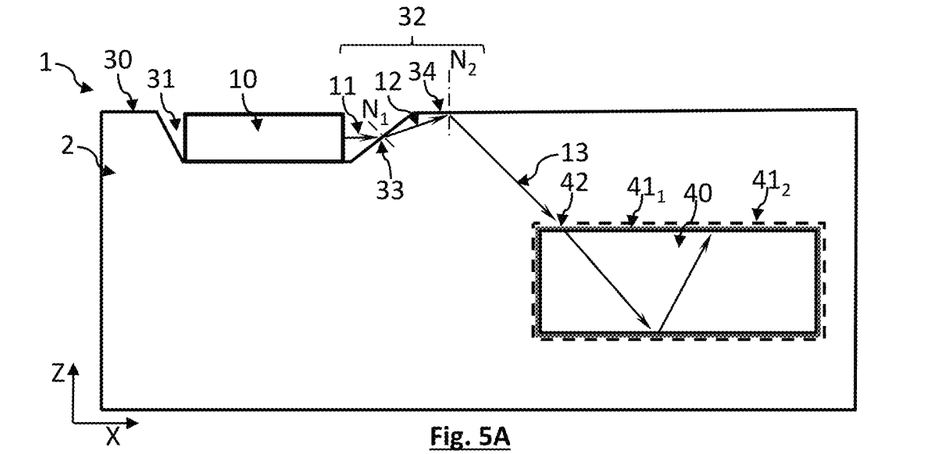
FIG. 5A is a cross-sectional view of second example of a device, in the transverse plane $P_{ZX}$.
Figure 5B:
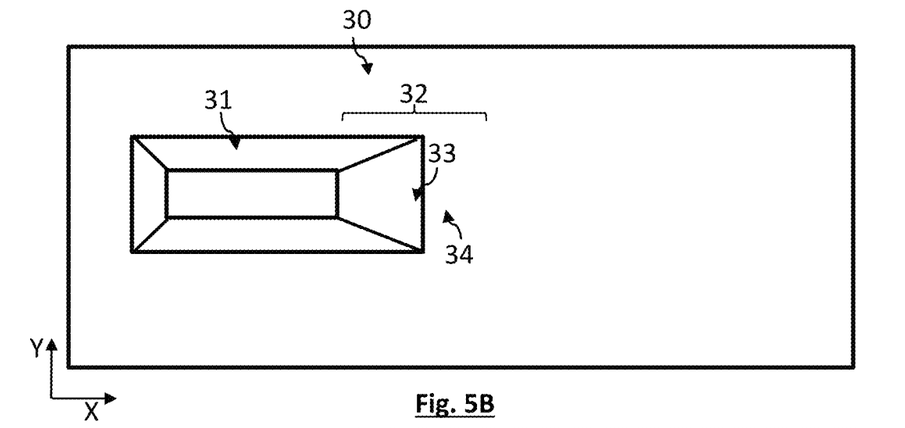
FIG. 5B is a top view of the device schematically represented in FIG. 5A, parallel to the plane $P_{YX}$.
Figure 5C:
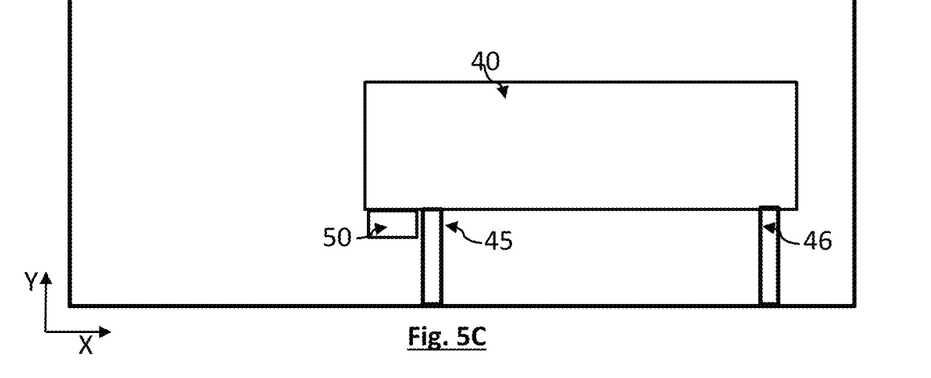
FIG. 5C is a cross-sectional view of the device schematically represented in FIG. 5A, in a cutting plane parallel to the plane $P_{YX}$ and passing through the cavity.

FIGS. 5A and 5C schematically represent a second embodiment. FIG. 5A is a cross-sectional view of the device, in a transverse plane $P_{ZX}$, parallel to the transverse axis Z and to the longitudinal axis X. FIG. 5B is a top view of the device, parallel to a plane $P_{YX}$, at right angles to the axis Z. FIG. 5C is a cross-sectional view of the device, in a cutting plane parallel to the plane $P_{YX}$ and passing through the cavity. The advantage of such a configuration, compared to the configuration described in association with FIGS. 1A to 1F, is that it minimizes the optical length travelled by the light beam through the substrate. According to this embodiment, the substrate does not include any auxiliary cavity 35. The distal face 34 is oriented parallel, or substantially parallel, to the emission axis $\Delta_1$. The thickness e between the top face and the cavity is preferably between 50 μm and 200 μm.

Figure 6:
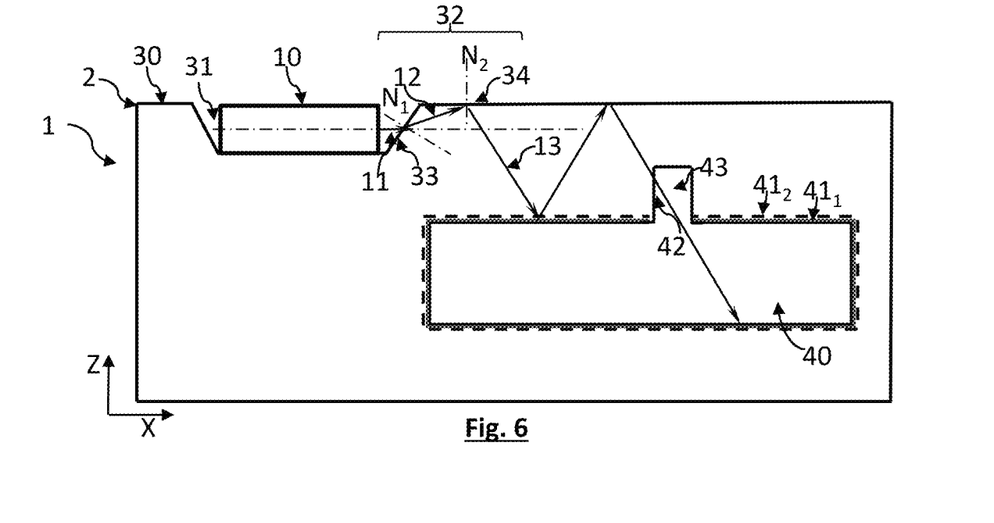

FIG. 6 schematically represents a variant of the second embodiment, in which the admission portion 42 of the cavity is formed by a protuberance 43 extending from the cavity.

In the configurations represented in FIGS. 5A to 5C and 6, the light beam penetrates into the cavity at an angle that is less grazing than in the configuration represented in FIGS. 1A to 1F. Such an embodiment is simpler to implement.

Figure 7:
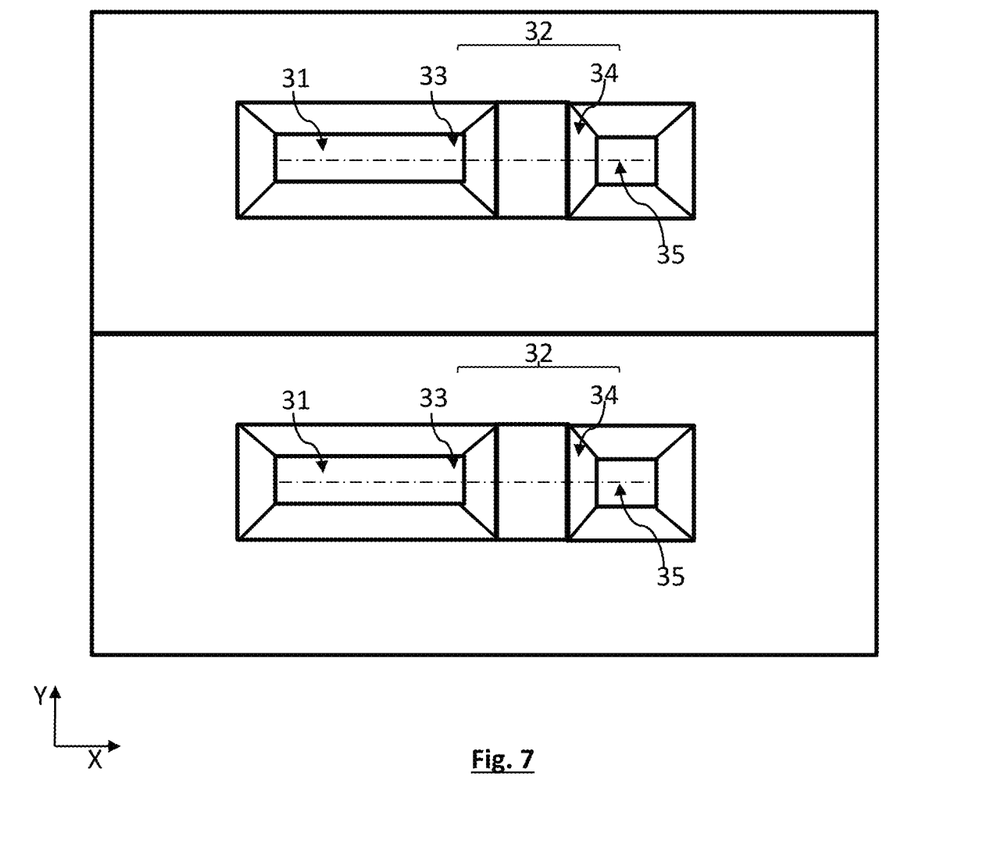
FIG. 7 illustrates the fabrication of two adjacent substrates.

As previously indicated, the substrate can be formed on a wafer comprising different identical substrates, adjacent to one another, structured according to a collective microfabrication method. A light source can be assembled on the trench formed in each substrate by a method of "Die to Wafer" type performed for example by "pick-and-place" type equipment. Each assembly makes it possible to form a detection device. The devices can then be separated from one another by cutting so as to obtain a plurality of devices. FIG. 7 illustrates a fabrication of two adjacent substrates.

Preferably, the material forming the substrate exhibits a transmittance, at the emission wavelength of the light source, such that at least 10% of the light power of the light beam reaches the cavity after being propagated from the proximal face to the distal face then from the distal face to the cavity.

Whatever the configuration, the invention makes it possible to minimize the surface area occupied by the device in a plane $P_{XY}$ at right angles to the transverse axis. The device forms a stacking, the source and the cavity being at a distance from one another along the transverse axis. The result thereof is a particularly compact device.

As previously indicated, the invention allows an optical coupling between the light source and the cavity without the use of a light guide and the associated alignment constraints. The optical coupling is produced by the structuring of the substrate, in particular the orientation of the proximal and distal faces previously described. The result thereof is a better reproducibility of the performance levels between two different devices.

The invention claimed is:

1. A photoacoustic detection device, comprising:
   a light source, configured to emit a light beam about an illumination axis;
   a cavity, configured to receive a gas;
   a detector, configured to detect an acoustic wave being propagated through the cavity;
the device comprising a substrate, extending between a bottom face and a top face, wherein the substrate is such that:
   the cavity is formed in the substrate, between the bottom face and the top face;
   a trench is formed in the substrate, the trench being delimited by the top face, the light source being inserted into the trench, on the top face, so that the top face thus extends between the cavity and the light source;
   the substrate comprises an illumination portion, delimiting the trench, disposed facing the light source, the illumination portion extending between:
      a proximal face, formed on the top face, disposed opposite the light source;
      and a distal face, formed on the top face, the distal face forming a reflector configured to reflect the light towards the cavity;
such that the light beam, emitted by the light source, is propagated, through the illumination portion, between the proximal face and the distal face, before being reflected, by the distal face, towards the cavity.

2. The device according to claim 1, wherein the distal face comprises a reflecting layer forming the reflector.

3. The device according to claim 1, wherein an antireflection layer is deposited on the proximal face.

4. The device according to claim 1, wherein:
   the proximal face extends at right angles to a proximal normal axis;
   the illumination axis is inclined with respect to the proximal normal axis.

5. The device according to claim 4, wherein the illumination axis is inclined with respect to the proximal normal axis, by an angle of inclination of between 50° and 60° or between 3° and 10°.

6. The device according to claim 4, wherein:
   the distal face extends at right angles to a distal normal axis;
   the distal normal axis is secant to the proximal normal axis.

7. The device according to claim 1, wherein:
   the trench extends to a bottom;
   the illumination axis is parallel to the bottom of the trench.

8. The device according to claim 7, wherein the distal face extends parallel to the illumination axis.

9. The device according to claim 1, wherein:
   the substrate comprises an auxiliary trench, delimited by the top face;
   the distal face delimits the auxiliary trench;
   the illumination portion extends between the trench and the auxiliary trench.

10. The device according to claim 1, wherein:
    the cavity is delimited by an inner face;
    the inner face comprises an admission portion, intended for an admission of the light beam being propagated towards the cavity from the distal face;
    the inner face comprises a reflecting layer, outside of the admission portion.

11. The device according to claim 1, wherein the detector is disposed in fluidic contact with the cavity, between the bottom face and the top face.

12. The device according to claim 1, wherein the cavity is linked to at least one fluidic channel, extending through the substrate, to allow the cavity to be filled by the gas, and/or the gas to be discharged.

13. The device according to claim 1, wherein the light source emits in an emission spectral band, in the infrared range, the substrate being formed by a material exhibiting a transmittance, in the emission spectral band, such that at least 10% of the light power of the light beam, emitted by the source, reaches the cavity after being propagated from the proximal face to the distal face then from the distal face to the cavity.

14. A method for analyzing a gas using a device according to claim 1, the method comprising:
    a) admission of the gas into the cavity;
    b) activation of the light source, such that the light source emits a periodically amplitude-modulated light beam;
    c) detection, by the detector, of a periodic variation of a pressure generated in the cavity by photoacoustic effect;
    wherein the light beam, emitted by the light source, is propagated, through the substrate:
       from the proximal face to the distal face of the illumination portion;
       then from the distal face to the cavity.

* * * * *